Patented Sept. 12, 1944

2,357,896

UNITED STATES PATENT OFFICE 2,357,896

OLEAGINOUS COMPOSITION AND METHOD

Charles S. Howe, Pasadena, Calif., assignor to Industrial Developments, Incorporated, Los Angeles, Calif., a corporation of California No Drawing. Application December 30, 1940, Serial No. 372,347

10 Claims. (Cl. 99—121)

This invention relates to oleaginous compositions and methods for their production, and relates more particularly to the formation of oleaginous products or creams containing a stable dispersed gaseous phase.

It is frequently desirable to endow an oleaginous product with the soft, easily worked, creamy consistency that is frequently found in cosmetic creams. On the other hand, it is equally important that the product stand up under maximum temperatures encountered in shipping, storing, and distribution.

A general object of the invention is to provide a method for the preparation of oleaginous products characterized by a creamy consistency but resistant to change at elevated temperatures.

As an example, edible butter readily softens or even melts when exposed to warm weather. The resulting shapeless oily mass is unappetizing, and the characteristic structure is frequently lost. Accordingly, butter is usually stored in refrigerators. Here it acquires a hard, semi-brittle consistency that is objectionable from the standpoint of most of the intended uses, as for spreading on bread, for mixing or creaming with sugar or flour in culinary processes and the like.

It is accordingly an object of the present invention to provide a "creamed" butter which is of easily workable consistency throughout a wide range of temperatures, and which may be made stable and temperature resistant to the degree that it may be stored for long periods of time at elevated temperatures, e. g., 100° F. or higher without extensive change in physical structure.

It is a further object of the present invention to provide a method for the manufacture of such a butter.

It is a further object of the invention to provide a method for increasing the bulk of solid or semi-solid oleaginous materials by the incorporation of finely dispersed air or other gas to produce better workability and to form a stable structure of creamy consistency and to provide a method for decreasing the temperature susceptibility and increasing the stability of such a dispersion.

It is a further object of the present invention to provide cosmetic preparations of the described physical structure.

It is a further object of the present invention to decrease the temperature susceptibility of butter, cosmetic creams, etc., and to provide high melting point fatty materials for admixture with lower melting point oleaginous products for the purpose of endowing the latter with such increased resistance.

In addition to the realization of the above objects, the present invention provides further advantages in that a method is provided for the conservation of surplus butter and its conversion into a lower cost product suitable for shelf storage and less critical distribution. The stability of the product makes it suitable for incorporation in the field rations of an army or elsewhere where no refrigeration is available for the storage of normal butter.

An important feature of the present invention is the vigorous or homogenizing agitation of heat-liquefied oleaginous material as the latter is cooled in the presence of a gas, such as air, whereby the gas is intimately dispersed throughout the solidifying mixture to form a cream.

Another important feature is the admixture of a high melting point fat with a low melting point fat or oil to obtain an oleaginous base for submission to the described agitation.

Further objects and aspects of the invention will become apparent from the following detailed discussion of specific embodiments and examples.

*Example 1.*—A hundred pounds of butter of usual market quality are heated to about 125° F. whereat the mass becomes fluid but not clear due to the presence of emulsified water, casein, and the like. To this liquid mixture there is added a small proportion of a high melting point fat, preferably a fat having a melting point above about 120° F., suitably a hydrogenated cottonseed oil stearin having a melting point of 135 to 140° F. For this purpose, from five to ten pounds of the flaky stearin, or more or less depending on the degree of temperature resistance which is desired in the ultimate product, are brought to a temperature in the neighborhood of 150° F. in order to melt the stearin.

The molten butter is slowly agitated while the stearin is admixed therewith, and the combined oleaginous materials are allowed to slowly cool with mild agitation. When the mass reaches a temperature of about 90 to 95° F., it begins to thicken and at 85° F. is quite thick. At the beginning of this thickening period, the violence of agitation is very substantially increased, and a substantial amount of air is beaten into the thickening material. This beating is continued during the cooling until the desired creamy consistency is obtained. As a rule, from one-half to one volume of air will thus be incorporated for each volume of butter so that about two pints of creamed butter are obtained for each pound of original butter.

The creamed butter is of a soft, velvety consistency over a wide range of temperature such that it may be easily spread upon bread or worked into flour, sugar, and the like. It is also resistant against the effects of temperature, and even when employing only about five per cent of the high melting point cottonseed oil stearin the creamed butter showed no signs of melting, weeping, or other loss of physical structure even after weeks of storage at 100° F.

I find it advantageous for the above purposes to use as the high melting point oleaginous constituent a commercially available hydrogenated cottonseed oil stearin known as flaked cottonseed oil and having a melting point in the neighborhood of 136° F. However, other high melting point fats, fatty acids, or waxes may be similarly employed, and the indicated range of melting points may be substantially reduced if exposure of the product to elevated temperatures is not contemplated.

I do not wish to be bound by any theories, but it would appear that what happens in the above process is that the high melting point fat which is added begins to crystallize out before the bulk of the oleaginous material thickens, and that the small minute crystals which are formed under the stated conditions of agitation serve as stabilizing agents of the Pickering type for the stabilization of a gas disperse, liquid continuous dispersion corresponding to the observed cream or froth. The dispersion thus formed is apparently of sufficient stability to last at least under the conditions of continued agitation until the dropping temperature causes substantial thickening or solidification of the external phase, whereupon the dispersed gas or air is permanently entrapped.

It will be noted that the system thus formed is stable even though reheated to temperatures somewhat in excess of the original temperature of formation, the gaseous dispersion prepared in this way being far more resistant toward the effects of temperature than would be predicated on the basis of the fatty constituents employed.

In some instances it is desirable to carry out the process under an atmosphere of nitrogen or carbon dioxide so that a chemically inert gas is incorporated into the butter, particularly if very prolonged storage at elevated temperature is contemplated.

*Example 2.*—For the production of a novel cosmetic having ingredients useful as a hair dressing or as a skin cream, I prepare a basic composition by melting a mixture comprising 70% of cocoanut oil, preferably hydrogenated and having a melting point of 110° F., 25% of anhydrous lanolin, and 5% of castor oil, the last named constituents, of course, having a substantially lower melting point than the hydrogenated cocoanut oil. This basic composition which forms a perfectly clear melt at about 125° F. is allowed to cool to about 95 or 100° F., at which it shows some slight indications of thickening. The mixture is then agitated with an egg beater type mixer until slightly thicker, say for a period of one-half to three-quarters of an hour, in which time it is increased in bulk somewhat by picking up a little air. The agitation in beating is then made quite vigorous and maintained during subsequent cooling until the desired creamy effect is obtained and the bulk of the mixture expanded some fifty or a hundred per cent. At this time, liquid petrolatum may be added if desired, a suitable quantity being 24 cc. per 100 grams of basic composition. The liquid petrolatum is not essential, but serves to extend the temperature range at which the cosmetic is soft and creamy so that it may be stored in and dispensed from tubes or jars even at very low atmospheric temperatures.

Cosmetic products having a similar physical structure may be made from other ingredients in which a high melting point cosmetic grade fat or fatty acid is combined with a lower melting point grease or oil.

It will be understood that the details of the above examples are intended as exemplary rather than limiting and that various changes and modifications may be practiced without departing from the essence of my invention as defined by the scope of the appended claims.

I claim as my invention:

1. A new composition of matter, comprising butter and a small proportion of a high melting point fatty material, said materials being substantially extended in bulk by the incorporation of a finely dispersed gas, substantially all of said high melting point fatty material being in the form of minute crystals and aiding in stabilizing said composition to permanently entrap said finely dispersed gas.

2. A method of making an oleaginous product which is of easily workable consistency throughout a wide range of temperatures and which is stable and temperature-resistant to the degree that it may be stored for long periods of time at temperatures of about 100° F. without substantial change in physical structure, which method includes the steps of: mixing together a melted lower-melting-point oleaginous material and a small proportion of a melted higher-melting-point fatty material, the latter having a melting point above about 120° F.; cooling the mixture to a temperature of about 90–95° F.; and then agitating the mixture in the presence of a gas during continued cooling and with sufficient violence to disperse a substantial volume of said gas throughout the mixture in the form of very small bubbles, said cooling during agitation being continued until a thickened creamy consistency is obtained.

3. A method as defined in claim 10 in which the higher-melting-point material is hydrogenated cottonseed oil stearin having a melting point in excess of 130° F.

4. A method as defined in claim 10 in which the lower-melting-point oleaginous material is butter and the higher-melting-point material is an edible fat, the relative proportions being about 5 to 10 pounds of fat to 100 pounds of butter.

5. A method of making a creamed butter which can be stored at temperatures as high as 100° F. for long periods of time without change in physical structure, which method includes the steps of: mixing melted butter and a small proportion of a melted high-melting-point material selected from the class consisting of high-melting-point fats, fatty acids, and waxes and which melt at a temperature above about 120° F.; cooling the mixture to a temperature of about 90–95° F.; gently agitating said mixture while it is cooled to said temperature of about 90–95° F. and then agitating the mixture in the presence of a gas during continued cooling and with sufficient violence to disperse a substantial volume of said gas throughout the mixture in the form of very small bubbles, said continued cooling during agitation being continued until a thickened creamy consistency is obtained.

6. A method as defined in claim 5 in which sufficient gas is dispersed in the mixture by agitation to increase its apparent volume by more than about half.

7. A method of making a creamed butter which is of easily workable consistency throughout a wide range of temperatures and which is stable and temperature-resistant to the degree that it may be stored for long periods of time at temperatures of about 100° F. without substantial change in physical structure, which method includes the steps of: providing a melted mixture of butter and a small proportion of a high-melting point fat having a melting point above about 120° F.; cooling the mixture while subjecting said mixture to gentle agitation through a temperature range in which said fat crystallizes and the mixture starts to thicken; and then violently agitating said mixture in the presence of a gas and during continued cooling to disperse a substantial volume of said gas throughout the mixture in the form of very small bubbles, the cooling of the mixture during such violent agitation being continued until the mixture is of a consistency sufficient to entrap said gas bubbles permanently in the mixture.

8. As a new composition of matter, a butter product which is of a consistency adapting the same for table and culinary use throughout a wide range of temperatures and which is stable and temperature-resistant to the degree that it may be stored for long periods of time at temperatures of 100° F. without substantial change of physical structure, said butter product being characterized by a gaseous dispersed phase and a continuous phase comprising a mixture of butter and hydrogenated vegetable stearin which stearin has a melting point above 120° F., the stearin being present in about the ratio of 100 pounds of butter to about 5–10 pounds of stearin with substantially all of said hydrogenated vegetable stearin in the form of minute crystals serving to stabilize said mixture.

9. A composition as defined in claim 8 in which the dispersed phase consists of an inert gas substantially free from oxygen.

10. A method of making an oleaginous product which is of easily workable consistency throughout a wide range of temperatures and which is stable and temperature resistant to the degree that it may be stored for long periods of time in temperatures of about 100° F. without substantial change in physical structure, which method includes the steps of: providing a melted mixture of a low melting point oleaginous material and a small proportion of a relatively higher melting point fatty material, the latter having a melting point above about 120° F.; cooling the mixture to a temperature of about 90–95° F.; and then agitating the mixture in the presence of a gas during continued cooling and with sufficient violence to disperse a substantial volume of said gas throughout the mixture in the form of very small bubbles, said cooling during agitation being continued until a thickened creamy consistency is obtained.

CHARLES S. HOWE.